July 19, 1949.    I. FIORI ET AL    2,476,850
ADJUSTABLE LOAD SUPPORT
Filed Oct. 8, 1947    2 Sheets-Sheet 1
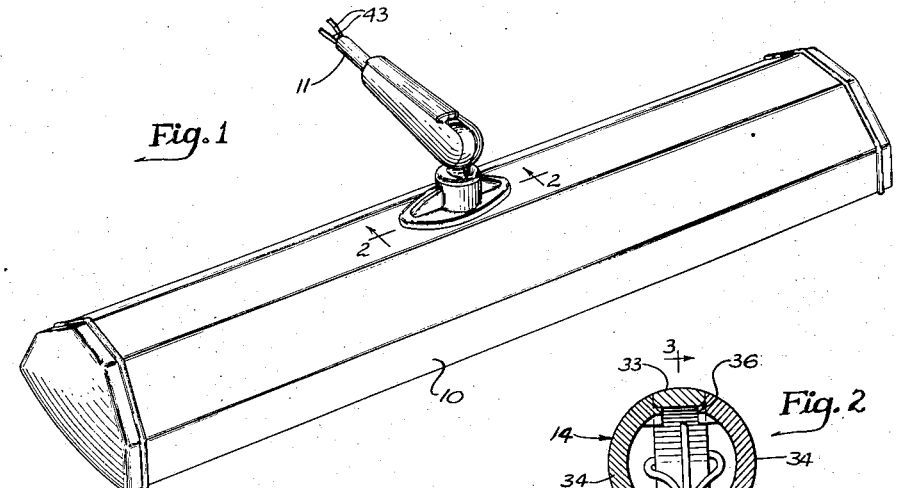
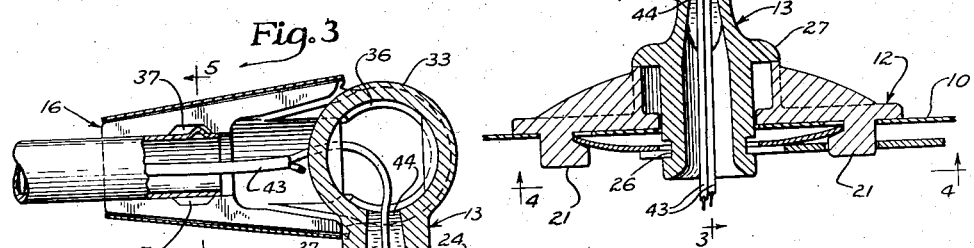
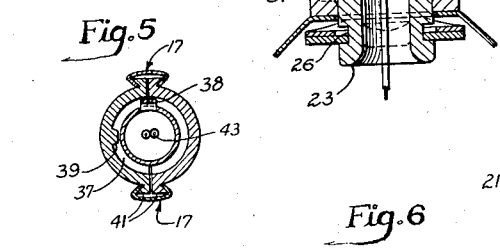
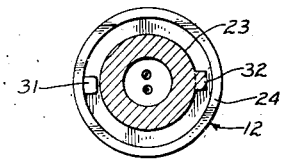
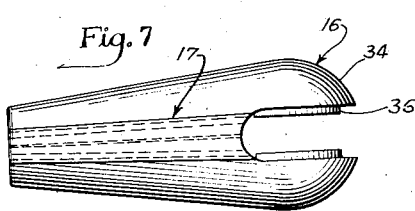
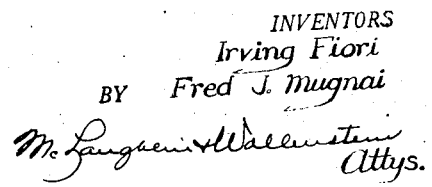
INVENTORS
Irving Fiori
BY Fred J. Mugnai
McLaughlin+Wallenstein
Attys.

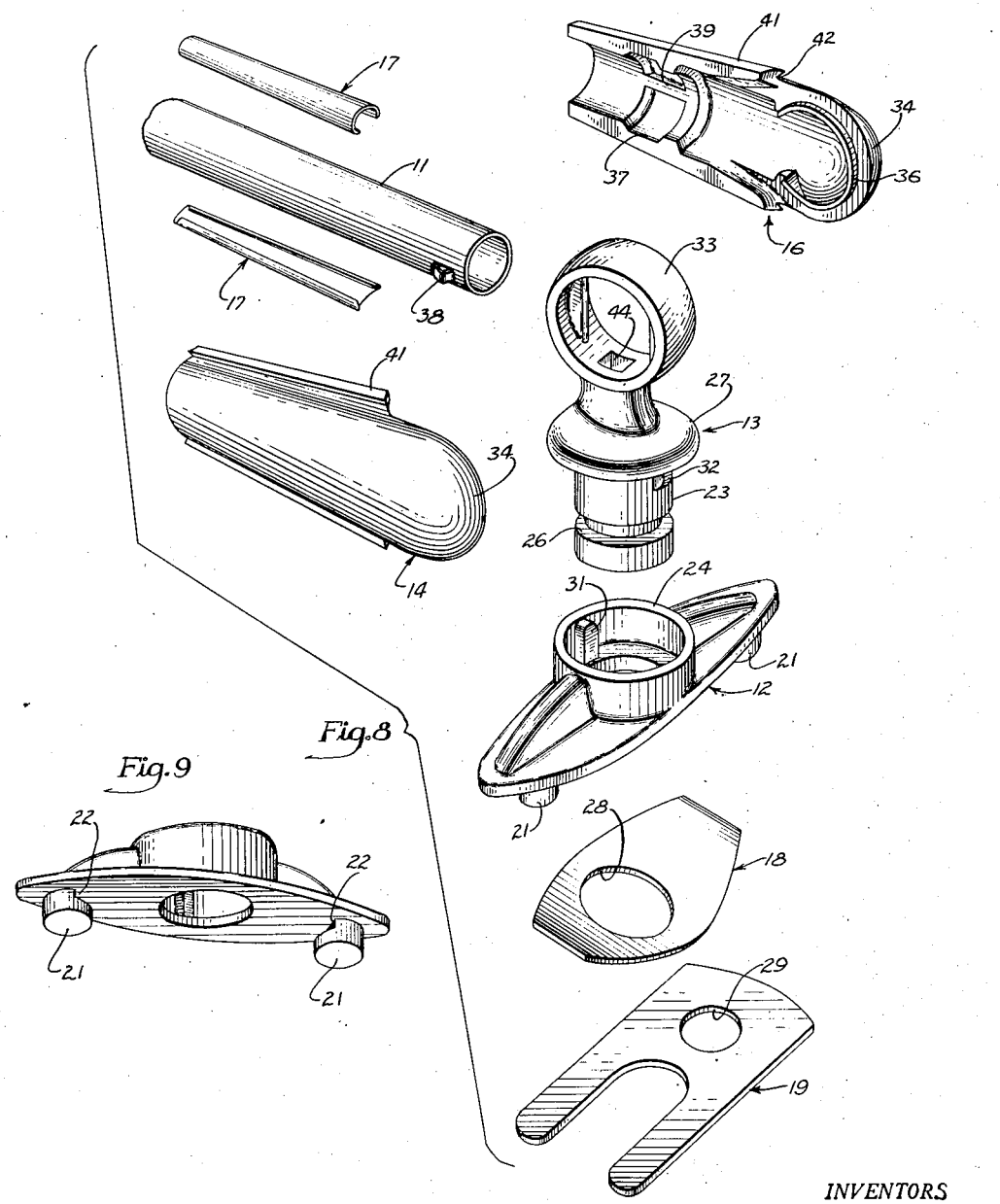

Patented July 19, 1949

2,476,850

UNITED STATES PATENT OFFICE 2,476,850

ADJUSTABLE LOAD SUPPORT

Irving Fiori and Fred J. Mugnai, Chicago, Ill., assignors to Art Specialty Co., Chicago, Ill., a corporation of Illinois Application October 8, 1947, Serial No. 778,614

10 Claims. (Cl. 287—100)

Our invention relates to adjustable load carrying support structures.

There are many instances, of which lamp supports are illustrative, in which a load must be adjustably supported and in which it is desired to maintain the load in a position to which it has been adjusted. Regardless of other adjustments, as, for example, arm extension and the like, a lamp should be supported for movement in three planes, and the problem of securing the necessary movement and maintaining adjustment is markedly increased as the load factor is increased, as is the case when a relatively large luminescent tube and housing are employed as contrasted with the small shade required with an old style incandescent lamp. The common practice heretofore has been to provide a simple form of pivot or pivots in which friction is imparted to the joint by means of spring washers generally of the type known in the trade as lock washers. These simple expedients were generally satisfactory when the supported load was not great but have proved unsatisfactory when the load is relatively great.

The principal object of our invention is the provision of an improved adjustable load support of the type identified hereinabove.

Another object is the provision of an adjustable load support which will maintain proper adjustment regardless of wear during the expected useful life of the apparatus with which it is associated.

A further object is the provision of an improved simplified adjustable load support which is simple and inexpensive to manufacture and readily assembled.

In carrying out the objects of our invention, we attach a mounting bracket to the housing by spring means, which spring means is also employed to retain in assembled relation with the bracket a swivel member having a tubular portion extending through the mounting bracket. The same spring which is utilized to mount the bracket to the housing also performs the function of maintaining friction between the swivel member and bracket. The swivel member also has a ring portion, the sides of which are engaged by a pair of clamping brackets which also extend around a free end of a conductor carrying tube. Resilient pressure is applied against the ring portion and tube by a pair of spring clips which engage opposite sides of the two clamping brackets. The structure provides three pivots which permit a lamp housing to be set to any desired position; and the parts are assembled and retained together solely by spring means without the aid of the usual bolts, screws, and the like, and in such a way as constantly to maintain friction between all relatively moving parts.

Other specific objects and detailed features of the invention will be apparent from a consideration of the following detailed description taken with the accompanying drawings wherein—

Fig. 1 is a perspective view of an adjustable load support following the features of our invention, a supporting tubular body being broken away to conserve space;

Fig. 2 is an enlarged vertical sectional view running longitudinally of the lamp housing and taken on the line 2—2 of Fig. 1;

Fig. 3 is a sectional view taken on the line 3—3 of Fig. 2;

Fig. 4 is a fragmentary bottom plan view taken on the line 4—4 of Fig. 2, looking in the direction of the arrows;

Fig. 5 is a transverse sectional view taken on the line 5—5 of Fig. 3;

Fig. 6 is a sectional view taken on the line 6—6 of Fig. 3;

Fig. 7 is a fragmentary plan view showing the clamping brackets and a spring clip on one side thereof;

Fig. 8 is an exploded view showing all of the parts in perspective; and

Fig. 9 is a perspective view of the mounting bracket shown from a different angle than appears in Fig. 8.

The device of our present invention is adapted for utilization with a structure such as shown in Fiori Patent No. 2,395,178 in which a reflector 10 is adjustably supported at the end of a hollow tubular arm 11. The reflector 10 with its lamp or lamps (not shown) comprises a relatively heavy load which must be adjustable with respect to the arm 11 in three planes to function in the most satisfactory manner and must indefinitely remain in the position to which it has been adjusted. The connection between the housing and tubular arm 11 is made through a number of parts shown in exploded form in Fig. 8 and comprising a bracket 12, a swivel member 13, clamping brackets 14 and 16, spring clips 17, a leaf spring 18 and bifurcated attaching plate 19.

The attachment to the reflector 10 is accomplished by means of the bracket 12, swivel member 13, together with the members 18 and 19. The bracket 12 corresponds generally to the type of bracket usually riveted to sheet metal and like housings but, in our construction, instead of being riveted in the usual manner, is provided with a pair of lugs 21 extending through apertures in the reflector 10 and having undercuts 22 (see Fig. 9), which, in a manner to be described, will be engaged by ends of the leaf spring 18. The swivel member 13 has a tubular portion 23 which extends through a boss 24 on the bracket 12 and through a central opening in the reflector. The swivel member has an annular recess 26 and apron 27, the latter engaging over the top of the boss 24, as shown particularly in Figs. 2 and 3. The tubular portion 23 also extends through the central aperture 28 of the leaf spring 18 and with the parts held in the position shown in Fig. 2 the legs of the bifurcated attaching plate 19 are engaged in the annular recess 26, and one of the lugs 21 engaged in aperture 29 in the attaching plate so that the attaching plate is prevented from sliding to disengage the swivel member, and the swivel member is prevented from being extracted longitudinally because of such engagement. It will be understood that the leaf spring 28 is normally quite arcuate as shown in Fig. 8, and when this spring is placed in the general position shown in Fig. 2 and depressed so as partly to flatten it, the attaching plate 19 is readily slid into position and when the spring is then disengaged there is a continual pressure of the apron 27 against the boss 24.

By means of the construction described immediately hereinabove the bracket 12 is attached to the reflector 10 and the swivel member 13 is rotatably supported with respect to the bracket 12. The friction created by the action of the leaf spring 18 is such as to hold the parts in the position to which they have been moved relatively to each other, the friction thus established being maintained even though considerable wear has occurred between the parts. Since the conductors leading to the lamps are passed through the bracket and swivel member, the bracket is provided with an internal projection 31 on the boss 24 and the tubular portion 23 is provided with an external projection 32 immediately below the apron portion 27. The projections 31 and 32 are thus placed so that they mutually interfere with each other at approximately 360 degrees rotation so that the reflector can be rotated substantially through 360 degrees but is prevented from rotating further at the two extremes of the movement thereby provided. Actually, the movement is somewhat less than 360 degrees because of the width of the projections, but from a practical standpoint the reflector can be rotated to substantially any position within the radius of a circle.

It is desirable that the reflector be rotatable in a vertical plane coinciding with the axis of the arm 11 so that the reflector can be suitably raised or lowered and the light brought to bear directly on the work. To this end, the swivel member is provided with a ring portion 33 against opposite sides of which the clamping brackets 14 and 16 engage. As most clearly shown in Figs. 2 and 8, ends 34 of the clamping brackets are rounded and slightly recessed so as to fit against the outside edges of the ring portion 33. To assure the parts remaining in assembled relation, the rounded portions 34 are provided with extending lips 36 which engage interiorly of the ring portion 33, as shown particularly in Fig. 2, and prevent extraction of the ring so long as the clamping brackets are held in position. The clamping brackets have a generally annular internal portion for receiving the tubular arm 11, with annular recesses 37 into which a projection 38 from the arm 11 extends. A longitudinal portion 39, provided in one of the clamping brackets, forms a stop so that the assembly comprising the two clamping brackets may also be rotated through somewhat less than 360 degrees around the tubular arm 11.

Each of the clamping brackets has a raised portion 41 along that portion of the edge removed from the rounded portion 34, and a generally V-shaped recess or undercut portion 42 is provided between the raised portion 41 and the remaining portion of the clamping bracket. The spring clips 17 are of generally arcuate shape, as shown particularly in Fig. 8, but have their edges in-turned so as to be engageable in the recesses 42. The edges of the spring clips are slightly tapered with respect to each other and so are the raised portions 41 and V-shaped recesses 42. The result is that the spring clips can be fitted over the raised portion and partly slid into position without appreciable effort, but relatively greater pressure is required to force them into the fully assembled position shown in Figs. 1 and 7. The taper of the parts is particularly apparent by reference to Fig. 7. The forcing of the spring clips into position causes the clamping brackets 14 and 16 to engage tightly but resiliently around the ring portion 33 of the swivel member 13 and around the end of the tubular arm 11. The result is a tight swivel around the axis of the arm 11 and also around the axis of the ring portion 33. Thus, with the parts shown in the relative positions illustrated in the drawings swivel movement is provided in the two vertical planes, one coinciding with the axis of the arm 11 and one perpendicular to the axis of arm 11. When the spring clips are forced into position, which may be accomplished in several ways, such as by the use of a simple form of assembly jig, the springs are caused to be slightly opened so that pressure is maintained on the parts at all times. Even after considerable wear due to relative movement between the parts the two swivel connections provided by the assembly comprising the spring clips remain tight.

It will be understood that the adjustable support means between the arm 11 and reflector 10 must be so arranged as to permit leading of conductors from the hollow arm to the interior of the reflector. Our construction provides for such arrangement. The conductors 43 extending through the tubular arm 11 may extend directly into the inner tubular portion formed by the two clamping brackets in the manner shown in Fig. 2 and the two conductors may pass around the ring portion 33 as shown particularly in Fig. 2 and Fig. 3. The ring portion 33 is apertured as shown at 44 to afford access to the hollow inside of the tubular portion 33 so that the two conductors as they pass around the edges of the ring portion 33 are joined and extend directly to the inside portion of the reflector. It will be noted that none of the fastening mechanism is in the path of the wires but the smooth interior of the tubular portion 23. The projection 38 and longitudinal portion 39 prevent complete rotation about the arm 11, and the two projections 31 and 32, as previously described, function as stops to prevent too great movement about the vertical axis comprising the tubular portion 23. As shown particularly in Fig. 3, the construction of the parts is such that movement about the swivel formed by the ring portion 23 is never more than approximately 180 degrees so that there is no possibility of twisting or scuffing the conductors.

What we claim as new and desire to protect by Letters Patent of the United States is:

1. An adjustable load carrying support structure between a tubular arm and member forming a load, said structure comprising a mounting bracket with lugs extending through a wall of said load member, said bracket having an annular apertured boss between said lugs, a swivel member with an apron engaging the boss and a tubular portion extending therethrough, said tubular portion having an annular groove therein, a normally arcuate leaf spring with an aperture through which the tubular portion extends and having its ends engaging said lugs to secure the bracket to said load member, an attaching plate having a bifurcated portion engaging in opposite sides of the annular groove in the tubular portion to hold the leaf spring in stressed relation and pivotally hold the swivel member against removal, said swivel member having an upper ring portion with its axis at right angles to that of the tubular portion, a pair of clamping brackets engaging around said tubular arm and ring portion, and a pair of spring clips engaging opposite sides of said clamping brackets to cause them to resiliently frictionally grip said arm and ring portion.

2. A structure as defined in claim 1 wherein said apertured boss has an internal projection and said tubular portion an exterior projection, together acting as stops to prevent complete relative rotation between the said members.

3. A structure as defined in claim 1 wherein said arm has a lateral projection and said clamping members together define an annular groove in which the projection moves, said annular groove being ribbed at one point to prevent complete relative rotation between the said members.

4. A structure as defined in claim 1 wherein said spring clips are generally arcuate with edges inturned and slightly tapering, and said clamping brackets have contiguous generally longitudinal projections with oppositely disposed slightly tapering V grooves for receiving edges of the spring clips, forcing the spring clips into position and having the effect of slightly expanding them to maintain tension.

5. An adjustable load carrying support structure between a tubular arm and member forming a load, said structure comprising a mounting bracket with lugs extending through a wall of said load member, said bracket having an annular apertured boss between said lugs, a swivel member with an apron engaging the boss and a tubular portion extending therethrough, said tubular portion having an annular groove therein, a normally arcuate leaf spring with an aperture through which the tubular portion extends and having its ends engaging said lugs to secure the bracket to said load member, and an attaching plate having a bifurcated portion engaging in opposite sides of the annular groove in the tubular portion to hold the leaf spring in stressed relation and pivotally hold the swivel member against removal.

6. An adjustable load carrying support structure between a tubular arm and member forming a load, said structure comprising a mounting bracket with lugs extending through a wall of said load member, said bracket having an annular apertured boss between said lugs, a swivel member with an apron engaging the boss and a tubular portion extending therethrough, said tubular portion having an annular groove therein, a normally arcuate leaf spring with an aperture through which the tubular portion extends and having its ends engaging said lugs to secure the bracket to said load member, an attaching plate having a bifurcated portion engaging in opposite sides of the annular groove in the tubular portion to hold the leaf spring in stressed relation and pivotally hold the swivel member against removal, and means forming an adjustable connection between said swivel member and tubular arm.

7. An adjustable load carrying support for attachment to a tubular arm comprising a mounting bracket secured to said load support, a swivel member pivotally connected to said mounting bracket, said swivel member having a tubular portion and an upper ring portion with its axis at right angles to that of the tubular portion, a pair of clamping brackets engaging around said tubular arm and ring portion, and a pair of spring clips engaging opposite sides of said clamping brackets to cause them to resiliently frictionally grip said arm and ring portion.

8. An adjustable load carrying support structure between a tubular arm and member forming a load, said structure comprising a mounting bracket secured to said load member, said bracket having an annular apertured boss, a swivel member with an apron engaging the boss and a tubular portion extending therethrough, said tubular portion having an annular groove therein, a normally arcuate leaf spring with an aperture through which the tubular portion extends, an attaching plate having a bifurcated portion engaging the annular groove in the tubular portion to swivelly frictionally attach the swivel member to the bracket, said swivel member having an upper ring portion, a pair of clamping brackets engaging around said tubular arm and ring portion, and a pair of spring clips engaging said clamping brackets to cause them to resiliently frictionally grip said arm and ring portion.

9. An adjustable load carrying support structure between a tubular arm and member forming a load, said structure comprising a mounting bracket secured to said load member, said bracket having an annular apertured boss, a swivel member with an apron engaging the boss and a tubular portion extending therethrough, said tubular portion having an annular groove therein, a normally arcuate leaf spring with an aperture through which the tubular portion extends, an attaching plate having a bifurcated portion engaging the annular groove in the tubular portion to swivelly frictionally attach the swivel member to the bracket and means providing an adjustable connection between said swivel member and said arm.

10. In an adjustable load carrying support, a bracket having a central apertured boss, a swivel member with a tubular portion extending through the boss and an apron engaging against the same, and spring means securing the bracket to the load member and resiliently frictionally holding the said apron against the said boss.

IRVING FIORI.
FRED J. MUGNAI.

No references cited.